… [19] United States Patent
Gabb et al.

[11] Patent Number: 5,616,168
[45] Date of Patent: *Apr. 1, 1997

[54] HYDROMETALLURGICAL PROCESSING OF IMPURITY STREAMS GENERATED DURING THE PYROMETALLURGY OF COPPER

[75] Inventors: Philip J. Gabb, Salt Lake City, Utah; J. Philip Evans, Georgetown, Canada

[73] Assignee: Kennecott Utah Copper Corporation, Salt Lake City, Utah

[*] Notice: The term of this patent shall not extend beyond the expiration date of Pat. No. 5,443,622.

[21] Appl. No.: 409,661

[22] Filed: Mar. 24, 1995

Related U.S. Application Data

[63] Continuation-in-part of Ser. No. 202,819, Feb. 28, 1994, Pat. No. 5,443,622.
[51] Int. Cl.$^6$ ..................................................... C22B 3/08
[52] U.S. Cl. ............................... 75/718; 75/726; 75/743; 210/711; 210/713; 423/367
[58] Field of Search ........................... 75/743, 718, 726; 210/711, 713; 423/367

[56] References Cited

U.S. PATENT DOCUMENTS

| | | | |
|---|---|---|---|
| 3,218,161 | 11/1965 | Kunda et al. | 75/108 |
| 3,575,853 | 4/1971 | Gaughan et al. | 210/46 |
| 3,617,559 | 11/1971 | Cywin | 210/46 |
| 3,728,430 | 4/1973 | Clitheroe | 423/26 |
| 3,747,764 | 7/1973 | Graham et al. | 23/10 |
| 4,186,088 | 1/1980 | Fitch et al. | 210/45 |
| 4,465,597 | 8/1984 | Herman et al. | 210/713 |
| 4,543,189 | 9/1985 | Rice et al. | 210/713 |
| 4,566,975 | 1/1986 | Allgulin et al. | 210/711 |
| 4,572,822 | 2/1986 | Abe et al. | 423/37 |
| 4,606,829 | 8/1986 | Rice et al. | 210/173 |
| 4,728,438 | 3/1988 | Featherstone et al. | 210/173 |
| 4,891,067 | 1/1990 | Rappas et al. | 75/101 |
| 5,032,175 | 7/1991 | Raborar et al. | 75/416 |
| 5,039,428 | 8/1994 | Wentzler et al. | 210/711 |
| 5,443,622 | 8/1995 | Gabb et al. | 75/743 |

FOREIGN PATENT DOCUMENTS

| | | |
|---|---|---|
| 1020363 | 10/1977 | Canada. |
| 2216114 | 10/1989 | United Kingdom. |

OTHER PUBLICATIONS

"Alternative Processing of Copper Smelter Flue Dust for Bismuth Control", D.K. Steele and K.S. Gritton, Separation Division Topical Conference on Separation Technologies New Developments and Opportunites, Miami Beach, FL, Nov., 1992, pp. 1–6.

*Primary Examiner*—Melvyn Andrews
*Attorney, Agent, or Firm*—Whyte Hirschboeck Dudek S.C.

[57] ABSTRACT

Impurity streams generated during the metallurgy of copper are hydrometallurgically processed at ambient pressure for recovery of primary values in an energy-efficient manner and with the capture and conversion of metallic impurities to states that are acceptable for disposal into the environment. Hallmark features of the various embodiments of this invention include the water leach of flue dust, a controlled acid leach stage in which metal species are solubilized, the extraction of copper as a sulfide, and the ability to operate the various process stages at essentially ambient pressure.

21 Claims, 6 Drawing Sheets

HYDROMETALLURGICAL PROCESSING OF IMPURITY STREAMS GENERATED DURING THE PYROMETALLURGY OF COPPER

CROSS-REFERENCE TO RELATED APPLICATIONS

This application is a continuation-in-part of application U.S. Ser. No. 08/202,819 filed Feb. 28, 1994 now U.S. Pat. No. 5,443,622.

FIELD OF THE INVENTION

This invention relates to the metallurgy of copper. In one aspect, the invention relates to the treatment of impurity streams produced during the smelting of copper concentrate and the converting of copper matte, while in another aspect the invention relates to an integrated hydrometallurgical treatment of flue dust, acid plant blowdown (APB) and bleeds from other processes typically associated with the hydrometallurgy of copper, e.g., copper and precious metal refining. In yet another aspect, the invention relates to a streamlined hydrometallurgical process that captures and returns for further processing many impurity stream components, some of which are further processed to desirable end products while others of which are rejected in a form suitable for environmentally acceptable disposal.

BACKGROUND

The modern demands to produce base metals in a profitable yet environmentally safe manner has caused many producers to re-examine their overall processing technology. Copper producers, like all other base metal producers, have long practiced technology that was effective for converting ore to finished products, but this technology must now meet ever-increasingly stringent environmental regulations. To meet these demands, copper producers can either retrofit their existing technology or introduce new copper pyrometallurgy. In either or both cases, the fundamental problem of controlling the destinations of impurities remains.

The pyrometallurgy of copper is a multi-step process, and impurity streams in their various forms are generated at each step. As here used, "impurity" means any component of the starting material that affects the ability to produce pure products and safe disposal streams. In the pyrometallurgy of copper, desired end products other than copper include the valuable metals generally found with copper in the copper ore, e.g., gold, silver, molybdenum, selenium and nickel. Depending upon the copper deposit, other desirable metals may also be present. Typical impurities, other than nonmetallic components such as the silicates and various other gauge components, include antimony, bismuth, arsenic, zinc, cadmium, mercury, iron, tellurium, and the like. While these metal values may be the subject of capture and eventual sale depending upon their concentration in the ore and the form in which they are present in the ore, these metals are typically the subject of capture for ultimate nonsale disposal.

The pyrometallurgy of copper begins with the smelting of copper concentrate to copper matte. This process generates impurities streams in the form of flue dust and APB (i.e. wet gas scrubbing liquids). During smelting, a process gas stream is produced into which various impurities are volatilized along with dust, the latter being the result of incomplete smelting of concentrate particles and which includes desirable end products. The impurities must eventually be separated from the desirable end products, and eventually eliminated from the pyrometallurgical circuit.

In addition, the smelting process generates gaseous products which have both heat and sulfur values. These gases are first transferred to a cooler, which may be a waste heat boiler for capture of the latent heat value, or to a water quench system if heat recovery is not required. Cooling of the gas by either of these methods results in the removal of dust that is mostly in the form of unsmelted particles. This material contains relatively small proportions of impurities and is generally recycled to the concentrate smelting process.

After cooling of the gas, a further stage of dry gas cleaning (e.g. a bag house, an electrostatic precipitator, etc.) is normally adopted to remove remaining unsmelted particles and species condensed from volatilized impurities. The impurity content of the product of this cleaning is much higher than the previously cooled material which, in the case of a copper concentrate with a low impurity content, can be returned to the concentrate smelting stage without major impact on the impurity content of the pyrometallurgical products. In the case of a copper concentrate with a high impurity content, this material must be processed separately from the concentrate smelting stage to avoid unduly raising the impurity content in the pyrometallurgical products.

After dry cleaning the gas, it still contains a minor quantity of unsmelted particulate and volatile impurities, the nature and quantity of volatile impurities being dependent on the temperature at which the gas was cooled. This gas also contains sulfur dioxide and sulfur trioxide values from the concentrate smelting process, which at certain locations around the world, is presently released to the atmosphere through a stack. However, in an increasingly environmentally conscious world, this practice is becoming less acceptable. Consequently, the sulfur dioxide and trioxide are now routinely the object of capture, and this is commonly accomplished in an acid plant. However before this gas can be used as a feed to an acid plant, it must be further cleaned in a wet scrubbing operation to remove the last traces of unsmelted particulate and volatile impurities.

During this wet scrubbing operation, sulfur trioxide is captured and forms a dilute sulfuric acid solution. At the same time the particulates are captured in solid form as a dilute slurry, and the volatile impurities are condensed to form either a solid material in the dilute slurry or dissolve in the dilute sulfuric acid. This dilute slurry must be removed from the scrubbing system as a bleed stream, and this is known as APB.

The copper matte produced by the smelting process is an intermediate which is then converted to blister copper in a conversion process. This process also generates a process gas containing unconverted particles and volatilized impurities both of which are treated in a manner similar to the concentrate smelting process gas.

In addition to the impurity streams generated in the smelter and converter, impurity streams are also generated in the fire refining of blister copper to anode copper in the anode furnaces, and in the associated processes of electrorefining of the anode copper and precious metal refining. The impurity streams from the electrorefining of copper and from the refining of precious metals can be variously liquids, solids and slimes.

Due to the presence of desirable end products, e.g., principally copper, gold and silver, and the desire to minimize the ultimate amount of material that must be removed from the pyrometallurgical process for nonsale disposal, these impurity streams are recycled to the fullest extent possible. However, recycle, if not carefully controlled, will inevitably result in increasing the amount of impurities in the intermediate and final products to a point at which the products are unacceptable. Different impurities have different impacts on the pyrometallurgical process and the properties of its end products.

For example, bismuth is known to be an embrittling agent in copper cathode (the desired copper end product) and although its general specification calls for less than 1 ppm, its use for wire drawing demands levels as low as 0.25 ppm. Unfortunately, bismuth has a great affinity for the copper phases of copper smelting and as such, a relatively small amount in the process, be it from the original copper concentrates or recycled impurity streams, can have a relatively large affect on copper cathode quality. Similarly, tellurium and selenium are also embrittling agents but since neither are very soluble in copper electrolyte, neither transfer to the copper cathode in any appreciable amount.

Antimony is similar in its behavior and concentrations in the overall process to that of bismuth although it impacts the quality of copper cathode differently. Whether antimony reaches the maximum level in cathode copper before bismuth does so is dependent upon the relative proportions of these elements in copper concentrate, and also upon their deportments in the particular copper smelting technology in use.

Although the target amount of lead in cathode copper is also relatively small, e.g. less than 5 ppm, the amount of lead in the overall process can be, and often is, orders of magnitude larger than that of bismuth and antimony. However unlike bismuth and antimony, a certain level of lead in anode copper (the penultimate copper end product) is beneficial to the production of copper cathode because lead contributes to the rejection of bismuth and antimony into the anode slimes (and thus obstructs their dissolution into copper electrolyte and their consequent deposition into the cathode copper).

Arsenic can have levels in the concentrates and the process intermediate products similar to lead, and it too has a beneficial level in anode copper. General refining practice is to require levels of arsenic equal to or greater than three times the combined molar composition of bismuth and antimony in the anode copper. This is believed to promote, in conjunction with the presence of lead, the deposition of bismuth and antimony into anode slimes. In some cases, smelters may add purchased arsenic in various forms to the smelting process to optimize the arsenic level in anode copper. Moreover, certain levels of arsenic in copper electrolyte also have a promotional effect in deporting bismuth and antimony to anode slimes, and thus inhibiting their dissolution in the electrolyte and possible ultimate deposition into the copper cathode.

Cadmium is an impurity that is found in close association with zinc but at much lower concentrations. While zinc deports in large measure to the smelter slag, cadmium preferentially volatilizes into the process gas and deports to dry dust and APB. While cadmium does not finally deport to the copper cathode, if repeatedly recycled to the smelter, it will build in concentration to a point that it becomes a health and environmental issue.

Like cadmium, mercury forms volatile species that report to the gas stream and in this case, almost exclusively to APB. If allowed to build in concentration in the gas stream, then it can have an adverse impact on the quality of the sulfuric acid produced by the plant.

The traditional methods of controlling these and other impurities have been the separate or partially integrated processing of the APB, the smelting and converting dusts, and the copper and precious metal refining bleeds. In some cases, these impurity streams are processed to remove at least a portion of the impurities present in the stream before the stream is recycled back to the pyrometallurgical circuit. In other cases, a portion of the impurity stream itself is simply removed from the circuit, e.g. flue dust can be collected and sold to various processors as a feed material for their operations, e.g., lead-zinc smelting facilities. However, due to the presence of valuable primary product in these impurity streams, such practices are often economically undesirable and in some remote locations, simply not available.

Over the years, copper processors have developed and operated various hydrometallurgical processes for treating flue dust for capture of its valuable components and for the ultimate removal of its undesirable components from the pyrometallurgical circuit. These hydrometallurgical processes have taken various forms, but usually involve the acid leaching of the dust to solubilize the metal components, and then the sequential precipitation of these various components. If possible, precipitated material, e.g., copper sulfide or hydroxide, is recycled to the smelter, and where not possible or practical, precipitated material, e.g., ferric arsenate or arsenic sulfide, is rendered environmentally acceptable and disposed, e.g., to a tailings pond or a managed hazardous materials facility. While most of these processes have proven effective in one manner or another, all are subject to improvement, particularly with respect to increased capture of desirable end products, energy reduction, and the reduction of materials ultimately discharged to the environment.

SUMMARY OF THE INVENTION

According to this invention, impurity streams generated during the metallurgy of copper are hydrometallurgically processed at ambient pressure for recovery of primary metal values in an energy-efficient manner and with the capture and conversion of impurities, particularly metallic impurities, to states that are acceptable for disposal to the environment. The improved hydrometallurgical process of this invention also produces environmentally acceptable effluent streams. In addition, the process can accept impurity streams from copper electrorefining and precious metal refining operations, and it can accept impurity streams in solid, liquid and slurry form. In short, the process of this invention enables the recovery of valuable products with the rejection of hazardous impurities to tailings ponds, managed hazardous materials facilities, and the like, and the rejection of nonhazardous impurities to the environment in an acceptable and benign form.

Generally, the process comprises receiving and subjecting copper-and impurity-containing materials from smelter sources to an acid leach in which the dust is "pulped", and solubilizing the soluble component, e.g. copper, arsenic, bismuth, antimony, etc., in the dust. The pulp is then subjected to a liquid/solid separation in which the solid is removed as a lead and precious metal-containing residue for further processing, and the liquid is forwarded to a copper precipitation stage.

In the acid leach stage, the solid fraction of the pulp is mixed with sulfuric acid, optionally sulfur and/or sulfur dioxide, steam, process water, and in some embodiments, APB, refinery bleeds, and recycled liquids from downstream processing steps.

The liquid fraction is forwarded to a copper precipitation stage in which it is admixed optionally with the solid fraction of the acid leach stage. In this case, the solid/liquid separation of the acid leach stage is not required, and the acid leach slurry is fed directly to the copper precipitation stage. By this means, the precious metals of the acid leach residue are incorporated into the copper sulfide product of the copper precipitation stage for return to a copper and precious metals recovery processing.

In the copper precipitation stage, a source of sulfur (e.g. elemental sulfur, cuptic sulfide and chalcopyrite) and sulfur dioxide or a source of sulfur dioxide (e.g. soluble sulfites and bisulfites) are added to precipitate copper as a sulfide. In a preferred embodiment, a portion of the separated solids are recycled to the copper precipitation stage in order to promote the precipitation of copper under conditions of high acidity (e.g. greater than 100 g/l acid). Under these conditions, copper is selectively removed from the acid leach solution leaving the other elements in solution for further processing. In a preferred embodiment, the solution from the copper precipitation stage is fed to a bismuth and antimony removal stage.

Hallmark features of the various embodiments of this hydrometallurgical process include the acid leaching of copper-containing dusts and the subsequent, selective copper precipitation at high acidity. One notable beneficial aspect of this invention is that it allows the removal of copper without passing through a partial neutralization stage.

DETAILED DESCRIPTION OF THE INVENTION

Figure 1:
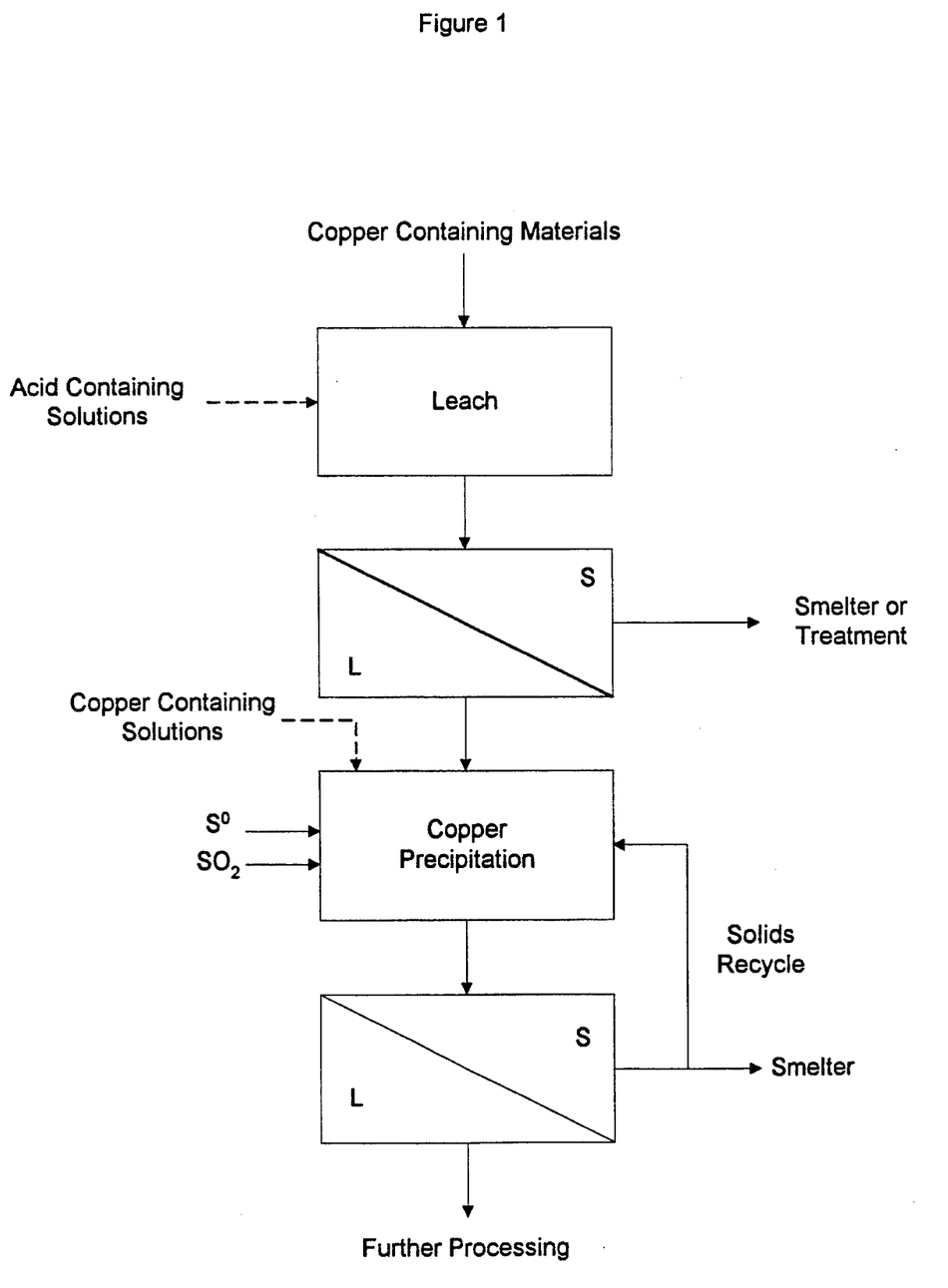
FIG. 1 describes an acid leach embodiment of this invention.

In FIG. 1, a solid copper-containing material, e.g. flue dust, from any source and generally collected through electrostatic precipitation or from bag houses, is pulped with process water and acid, typically sulfuric acid and optionally APB and other acidic liquid bleeds, e.g. copper refinery bleeds, to an initial acid concentration of at least about 100 g/l, preferably at least about 120 g/l and possibly 200 g/l. The pulping can occur remote from the hydrometallurgical facility, e.g. at the smelter or converter, or at the hydrometallurgical facility. Generally, remote pulping is preferred because it avoids transporting dust about the smelter and the hydrometallurgical facility.

Here, a majority of the deleterious impurities such as arsenic, bismuth and antimony are solubilized. Lead and the precious metals do not appreciably solubilize in this stage. The acid leach pulp is strongly acidic at commencement of the leach and reduces in acidity as it passes through the leach stages. Typically, there will be three or more continuous acid leach reactors a final level of acidity, say 90 g/l, is necessary to maintain the solubility of the feed components, especially that of bismuth. Halides, e.g. chlorides and fluorides, are also beneficial to this stage because they assist in maintaining the solubility of the impurities, especially bismuth. The sources of the halides in this stage include the process water, copper-containing materials, and the addition of halide-containing materials such as sodium chloride.

Acid necessary for the leaching of the copper-containing solids can be supplied either by fresh commercial acid or by the acid content of feed streams, e.g. refinery bleeds and APB. One feature of this invention is that the acidity of these feed streams can be usefully employed. APB can be added directly to this stage or its acid content can be recycled from subsequent precipitation stages, e.g. an arsenic/cadmium precipitation stage. Refinery bleeds, especially tank house electrolyte, also contain beneficial amounts of free acid and can be used similarly. To obtain a beneficial contribution, the acid content of the feed streams should be above the final concentration of the acid leach, e.g., typically above 90 g/l sulfuric acid.

If the refinery bleeds are liquids and if they are admixed with the other components of the acid leach stage, they can be introduced either separately or first commingled with one another and then introduced as a blend. As a practical matter, the acidity of the bleed from the copper electrorefining operation is typically much higher than that from a hydrometallurgical precious metal refining operation and as such, the characteristics of the former dominate those of the latter, regardless of whether introduced separately or as a blend.

By the careful operation of this acid leach stage, significant benefits are obtained. Specifically, if the concentration of copper and copper plus iron in the leach solution is maintained within certain desirable limits, these limits being a function of the nature of the dust, acidity, temperature, residence time, and like variables, the solubilities of bismuth and antimony can be optimized. If the concentration of copper and copper plus iron in the leach solution is allowed to rise above these desirable levels, then the solubility of bismuth and antimony are suppressed. Typically, the temperature at which the acid leach is conducted is between about 60 and about 10 degrees C. below the boiling point of the solution, preferably between about 75 and about 95 C.

After the deleterious metal values have been solubilized, the acid leach pulp is subjected to a solid/liquid separation, again by any conventional means. This solid-liquid separation (here and in all other appearances of solid-liquid operations) includes the operation of minimizing the loss of soluble values by the conventional operations of filtration and/or washing. The liquid fraction is forwarded to the copper precipitation stage in which it is optionally admixed with liquid copper-and impurity- (e.g. bismuth) containing feeds, e.g. refinery bleeds. Such admixed feeds can also be routed to the acid leach stage but in the case where these feeds have an appreciable concentration of soluble bismuth, they can affect the final extraction of the bismuth from the solid feeds to the acid leach stage, e.g., the copper-containing materials. Such feeds, i.e., those containing appreciable soluble bismuth, are preferably routed to the copper precipitation stage.

The solid fraction from the acid leach stage contains copper, precious metal, lead and other metal values. This residue can be removed from the circuit, e.g., sold or transferred to a lead smelting facility for recovery of the lead and precious metal values. In the process of this invention, the solid fraction of the acid leach stage is transferred either to the copper precipitation stage, or separately extracted and recycled to the copper processing operation. The eventual recycle of the lead to a copper smelter is of little consequence. If the amount of lead in the original concentrate is initially low, then the recycle of lead is good as described above relative to the manufacture of cathode copper. If the amount of lead in the original concentrate is high, then a value still exists in returning the acid leach residue to the smelter because of the precious metal content. The undesirable lead can be removed from the anode refining furnace as a lead silicate slag which can be processed elsewhere, e.g., at a lead smelter. If the lead residue from the acid leach stage is simply discarded, too much precious metal value is potentially lost.

Copper is precipitated as cupric or cuprous sulfide and recovered by solid/liquid separation techniques for ultimate return to the smelter. Some conventional hydrometallurgical processes extract copper by solvent extraction followed by electrowining. These are cumbersome, energy-consuming techniques that are unnecessary when copper can be returned directly to the smelter.

Another feature of this invention is that the amount of copper that is extracted from the feed solutions to the copper precipitation stage is maximized at a high level (e.g., over 90%, typically close to completion).

The liquid fraction of the copper precipitation stage can be processed in a number of different ways. In the embodiment shown in FIG. 2, the liquid fraction is forwarded to a further stage of sulfide precipitation using the same reagents as in the copper precipitation stage, i.e. sulfur and a source of sulfur dioxide. In this stage the oxidation-reduction potential (O.R.P.) is lowered to a level at which bismuth and antimony precipitate as sulfides. In the case in which the incoming acidity is too high for complete precipitation of bismuth and antimony, e.g. due to high generation of acid in the copper precipitation stage, then a preceding partial neutralization stage is required. Any suitable neutralizing agent may be used and any solid neutralization product can be disposed, e.g. to a tailings dam. In the case in which the acidity is reduced to typically 20 g/l free sulfuric acid, an O.R.P. of less than 200 mv is required to precipitate bismuth and antimony.

Figure 2:
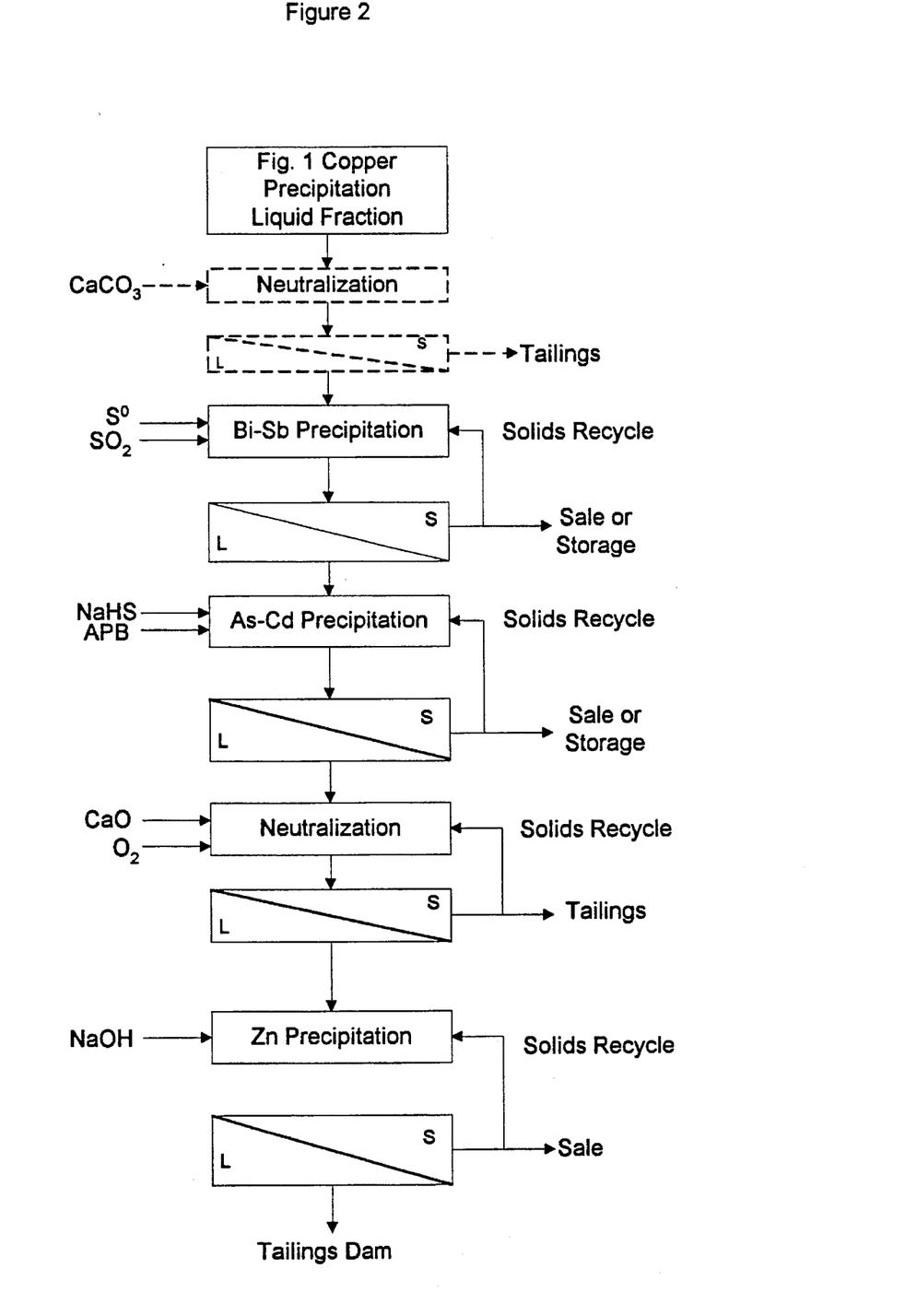
FIG. 2 describes one embodiment of processing the liquid fraction from the copper precipitation stage of FIG. 1.

The slurry from the bismuth and antimony precipitation stage is subjected to a solids/liquid separation step, and a proportion of the solid stream is recycled to the bismuth/antimony precipitation stage to promote the reaction. The remainder of the solids are removed for sale or disposal.

The liquid stream passes to an arsenic and cadmium precipitation stage, optionally with APB, at which a precipitating agent, e.g. hydrogen sulfide gas or a salt of hydrogen sulfide, such as sodium or calcium hydrogen sulfide, is admixed with the stream to remove selectively the arsenic and cadmium. The slurry from this stage passes to solid/liquid separation, and a portion of the solid stream is again recycled to the precipitation stage to promote the reaction. The remainder of the solids are removed for sale or disposal.

The liquid stream from the arsenic-cadmium precipitation passes to a neutralization stage for iron removal. Iron is oxidized with any suitable oxidizing agent, e.g. gaseous oxygen, and then is precipitated with any appropriate neutralization agent, e.g. limestone, lime, etc. In the case of selective iron precipitation, i.e. the precipitation of iron while retaining other soluble species in solution, the pH of the slurry is controlled at a range of 3.5 to 4. In the case of total or nonselective precipitation of soluble metal species, the pH is controlled at range of about 9.5 to 10.5. The slurry from this stage passes to solid/liquid separation, and a portion of the solid stream is again recycled to the precipitation stage to promote the reaction. The remaining solids pass to nonhazardous waste disposal, e.g. a tailings dam. This produces a gypsum precipitate that passes solid waste discharge regulations.

The liquid stream from the iron precipitation stage when at a pH of 9.5 to 10.5 passes directly to an effluent disposal, e.g. a tailings dam. If the pH is at 3.5 to 4.0, then the liquid stream is directed to a further stage of neutralization to precipitate zinc and residual cadmium. In this case the neutralization reagent is, for example, sodium hydroxide and the products are zinc and cadmium hydroxides which are removed by a further stage of solid-liquid separation. The liquid stream from this solid-liquid separation stage passes to effluent disposal, e.g. a tailings dam. The liquid effluent is minimized to meet mass discharge regulations.

Figure 3:
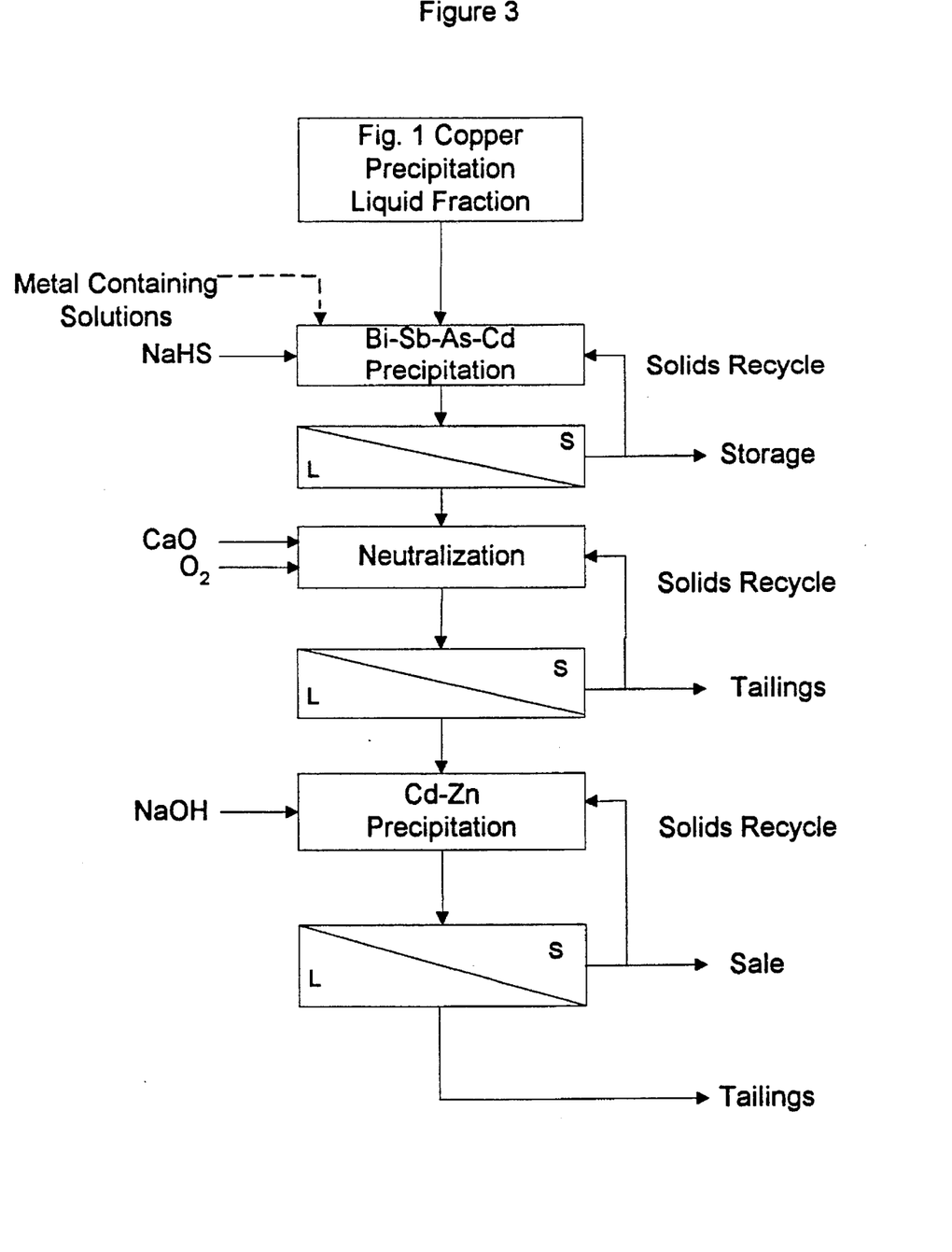
FIG. 3 describes another embodiment of processing the liquid fraction from the copper precipitation stage of FIG. 1.

In another embodiment of this invention, as shown in FIG. 3, the liquid stream from the copper precipitation stage (see FIG. 1) passes to a sulfide precipitation stage for removal of bismuth, antimony, arsenic, and in lower acidity circumstances, some of the cadmium. In this stage, the liquid stream is admixed with a source of hydrogen sulfide, e.g. NaHS, and the resultant slurry is sent to a solids-liquid separation operation. A portion of the solids stream is recycled to the precipitation stage to promote the reaction, and the remainder is sent to further processing or disposal.

The sulfidizing reagent is preferably NaHS as a solution in water, but it can also be liquid or gas. The use of NaHS is preferred because it is less volatile and more controllable in the reaction, which in turn means that less is by-passed in the reactor, which in turn means that less chance exists for noxious emissions, which in turn means a lower demand for neutralizing reagent to scrub it from the reactor off-gases. On the other hand, the use of hydrogen sulfide in gaseous or liquid forms does not contribute sodium ions to the solutions which may impact the environmental acceptability of effluent discharges.

The liquid stream from the above sulfurization stage is sent to a neutralization stage for iron removal similar to the iron stage of the previous embodiment. Solids from this stage are similarly routed to disposal, e.g. a tailings dam, and the liquid stream is similarly routed to effluent disposal, e.g. a tailings dam.

In cases in which appreciable zinc is present in the solution passing to iron precipitation, the pH of the iron precipitation stage can be controlled at about 3.5 to 4.0 as described in the previous embodiment, and the liquid stream routed to a zinc precipitation stage. Cadmium will also be extracted in this stage, and the amount will depend upon that quantity which passes through the sulfidization stage described above. This is a function of the acidity of that stage, higher acidities yielding a lower precipitation of cadmium.

As in the previous embodiment, a portion of the solids from the precipitation stages are recycled to the precipitation stages to promote the reactions. Likewise, APB can be fed to the sulfidization stage.

Figure 4:
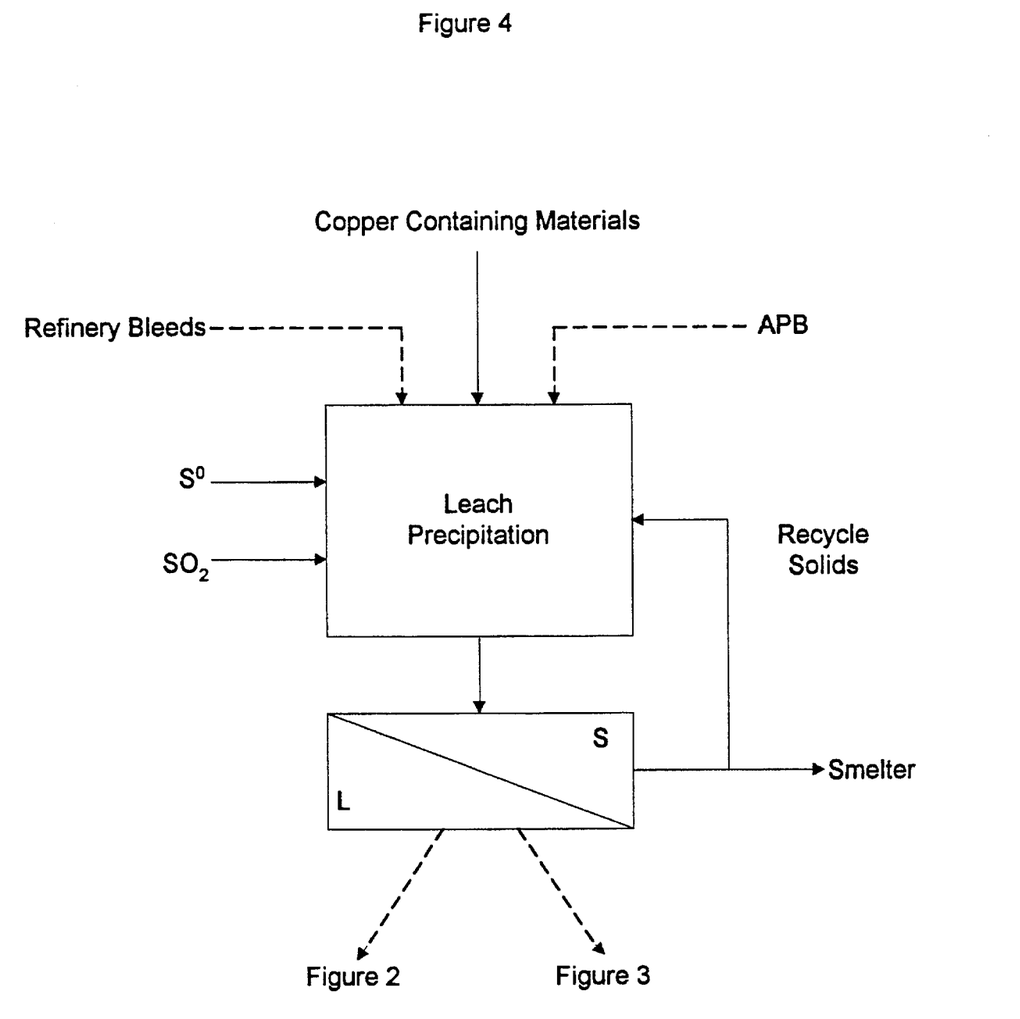
FIG. 4 describes a variation on FIG. 1 in which several process steps are consolidated into one.

In yet another embodiment of this invention as depicted in FIG. 4, the stages of FIG. 1 are consolidated into a single stage. In this particular embodiment, the copper-containing material is admixed with process water, steam, a source of sulfur (e.g. elemental sulfur, chalcopyrite, cupric sulfide, etc.), a source of sulfur dioxide, and optionally a source of sulfuric acid, e.g. APB, refinery bleeds, concentrated sulfuric acid, and the like. In this operation, the copper in the solid copper-containing material is first solubilized and then precipitated as a copper sulfide. The other soluble species remain in solution due to the high acidity of the slurry.

The slurry is passed to a solids-liquid separation operation in which a portion of the solids are recycled to the precipitation stage, and the remaining solids are passed forward for further processing, e.g. flotation of the copper sulfide content, a copper smelter, etc. The liquid stream is also passed forward for further processing, e.g. the process trains of FIGS. 2 and 3.

Figure 5:
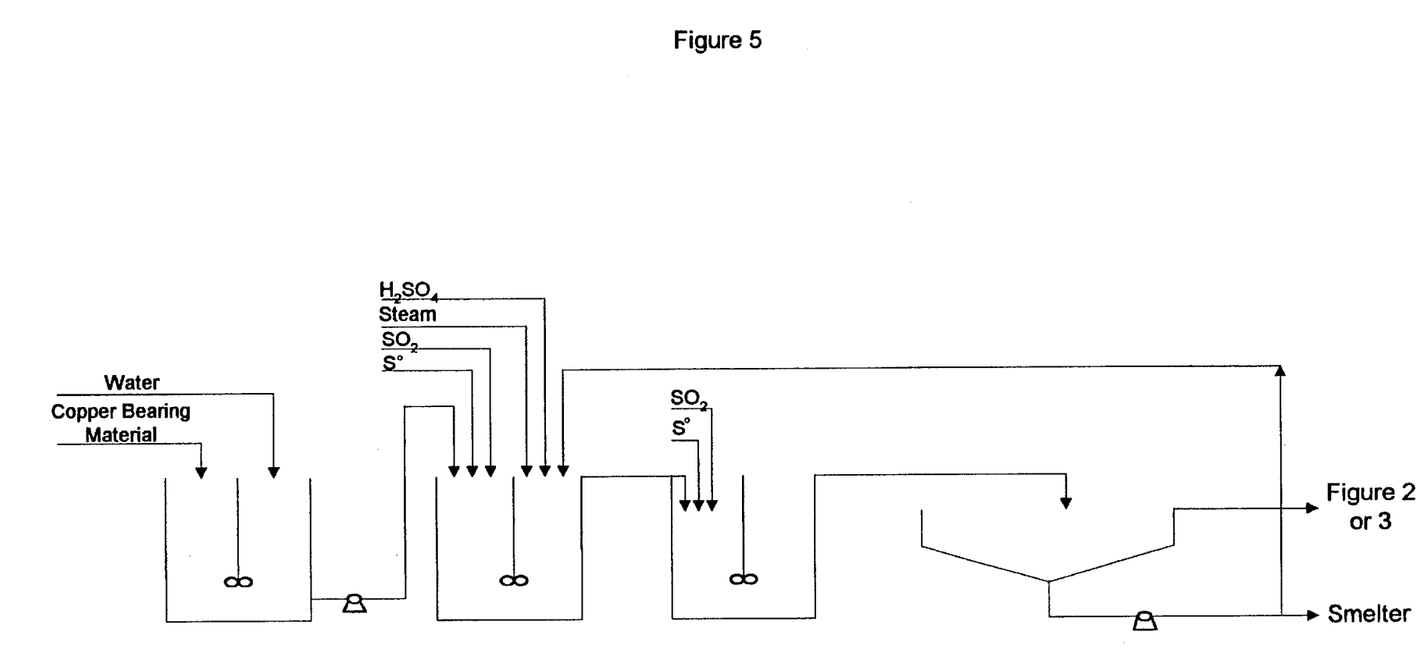
FIG. 5 describes the leach precipitation stage of FIG. 4 in expanded detail.

One embodiment of FIG. 4 is shown in FIG. 5. In this embodiment, the copper-containing solids are first pulped with process water, and the resulting pulp is transferred for species solubilization and copper precipitation. Other materials used in this operation include steam, a source of sulfur, a source of sulfur dioxide, and a recycle solids stream from a downstream solid-liquid separation operation. Optional material that can be added to this operation includes a source of sulfuric acid.

Soluble copper from the water pulping operation and from sources of soluble copper added to the operation is precipitated by the copper precipitation reaction to form solid copper sulfide and free sulfuric acid. For every weight unit of copper that is precipitated in this manner, three weight units of sulfuric acid is also produced. This acid can be used to supplement the other acid requirements of the operation to leach solid species, e.g. copper, arsenic, antimony and bismuth, from copper-containing materials.

Further operations of species solubilization and precipitation may follow in which a source of sulfur dioxide, a source of sulfur, and a source of steam may be added. The product from the final stage of solubilization and precipitation passes to a solid-liquid separation operation from which a portion of the solids is recycled to the first solubilization-precipitation operation described above. The remaining solids are transferred for further processing, and the liquid stream is sent to the process trains of FIGS. 2 and 3.

Figure 6:
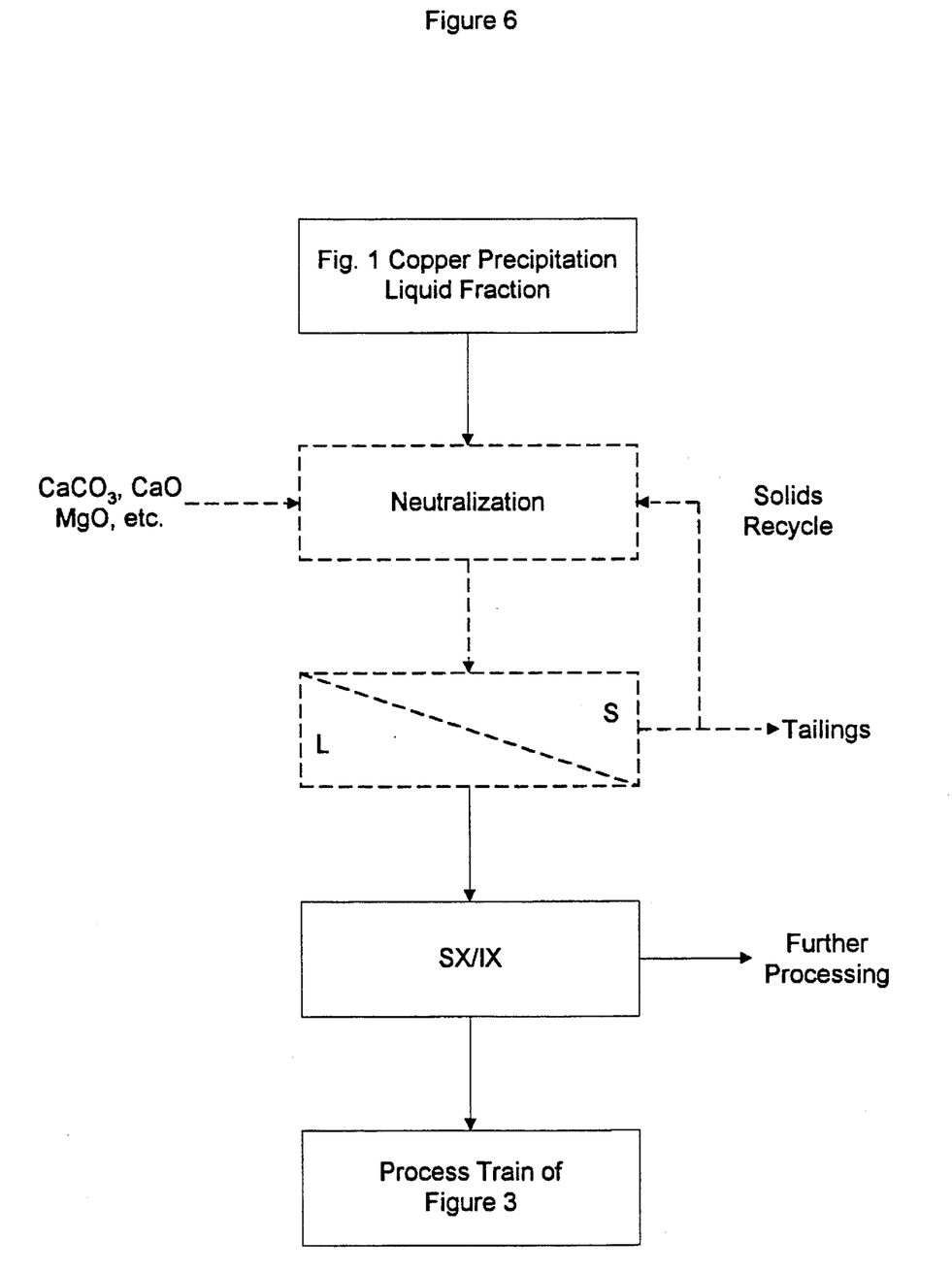
FIG. 6 is another embodiment of processing the liquid fraction from the copper precipitation stage of FIG. 1.

The process train of FIG. 6 couples the process trains of FIGS. 1 and 3. The liquid from FIG. 1 passes to a neutralization stage to decrease the acidity of the solution to a level at which it is acceptable for solvent extraction or ion exchange operations. The neutralization operation can use a range of different neutralizing reagents such as those previously described. The slurry from the neutralization operation is passed to a solid-liquid separation operation, and a portion of the solids is recycled to the neutralization operation. The remaining solids are disposed in an environmentally acceptable manner, e.g. sale, a tailings dam, etc. The liquid stream passes to one or more solvent extraction or ion exchange operations to remove various metal species, e.g. bismuth, antimony, molybdenum, zinc, and the like. The eluates from these operations pass to further processing for removal of the metal species in a suitable form, e.g. as metals or metal salts. The final raffinate from these operations passes, optionally, to a process train (such as that described in FIG. 3) for removal of residual metal species.

As in the embodiment of FIG. 4, the embodiment of FIG. 1 can also be preceded by a water pulping stage. Pulping has the distinct advantage of solubilizing most, if not all, of the soluble copper, e.g. copper sulfate ($CuSO_4$), present in the dust. The other metal values in the dust, e.g. bismuth, arsenic, cadmium, zinc, iron, antimony, molybdenum, selenium, tellurium, and the like, may or may not solubilize depending upon the form in which they are present. For example, cadmium is usually present in a highly water-soluble form and as such, most of it is also solubilized. Zinc and arsenic, on the other hand, are usually present in a less water-soluble form and as such, solubilize to a less extent than either copper or cadmium. Many of the other metals present in the dust are present in a nonsoluble form, relative to copper and cadmium, and as such do not solubilize to any great extent. The nonsoluble metals, of course, remain in the leached particles. The acidity of the pulp mass is a function of the flue dust since the pH of the process water is for all intent and purposes neutral.

The process of this invention provides an inherently safer and more hygienically acceptable treatment of impurities from the metallurgy of copper than existing alternatives. The use of a water leach stage at the front end of the circuit allows handling of electrostatic precipitator dust as a pulp, and this can be done at a dust extraction device, e.g., an electrostatic precipitator (ESP) or a bag house, rather than handle dry dust.

The process of this invention also allows for the early separation of bismuth from lead, which in turn allows the recycling of the lead residue (which usually contains a fair amount of precious metal value) to the smelter. In effect, the process of this invention creates another door for removing bismuth from the copper production circuit.

This invention also allows for the processing of all impurity streams associated with a process for the metallurgy of copper. The bleed streams from the copper electrorefining and precious metal refining operations can be fed individually or as a blended stream and depending upon their compositions, can be fed to the acid leach and/or copper precipitation stage. The decision as to where to introduce these bleed streams depends upon their particular composition.

The arsenic/cadmium precipitation stage can receive APB directly and thus by-pass the acid leach stage. This imparts desirable flexibility to the hydrometallurgical process because when upstream components to the process are under maintenance, e.g. copper-containing dust can be recycled temporarily to the smelter, and the hydrometallurgical plant can still accept APB from the acid plant. This avoids the need of constructing a separate APB processing facility to ensure that the main smelter process can continue operation.

The process is designed to recycle as much liquid to the upstream stages as possible to reduce the final effluent and the need for make-up water. This is done by returning filtrates from the solid/liquid separation stages to the acid leach and by utilizing final sulfide precipitation liquids as the repulping solution when neutralization precipitate is rejected with the final neutralization precipitate.

While this invention has been described in specific detail by reference to the Figure, this detail is provided for purpose of illustration only and is not to be construed as a limitation upon the invention as described in the following claim.

What is claimed is:

1. A hydrometallurgical process for the recovery of primary metal values and the capture and conversion of metal impurities to states that are acceptable for disposal to the environment from impurity streams generated during the pyrometallurgy of copper, the process comprising the steps of:

A. Acid leaching solids containing copper and at least one metal species selected from the group consisting of precious metals, bismuth, arsenic, iron and cadmium to produce an acid leach slurry of a first liquid component containing soluble metal species and a solid component depleted of the metal species;

B. Separating the acid leach slurry into a first liquid fraction comprising at least part of the first liquid component, and a residual fraction comprising the solids component;

C. Transferring the first liquid fraction to a copper precipitation stage, and admixing the first liquid fraction with a source of sulfur, a source of sulfur dioxide, and recycled copper sulfide, to form a slurry of precipitated copper sulfide and a second liquid component depleted of copper;

D. Separating the slurry of (C) into a second liquid fraction comprising a portion of the second liquid component, and a residual fraction comprising the precipitated copper sulfide and the remaining second liquid component; and E. Recycling a portion of the precipitated copper sulfide to the copper precipitation stage.

2. The process of claim 1 in which an acid-containing solution is fed to the acid leaching operation of step (A).

3. The process of claim 2 in which the acid-containing solution is acid plant blow-down.

4. The process of claim 1 in which a copper-containing solution is fed to the copper precipitation stage.

5. The process of claim 4 in which the copper-containing solution is at least one of a copper refinery or precious metal refinery bleed.

6. The process of claim 1 in which the second liquid fraction is passed to a bismuth-antimony precipitation stage, and is admixed with a source of sulfur, a source of sulfur dioxide, and recycled solids to form a slurry of a third liquid component and a solids component.

7. The process of claim 6 in which the slurry formed in the bismuth-antimony precipitation stage is transferred to a solid-liquid separation in which a third liquid fraction is separated from the slurry, and at least a part of the solids in the remaining slurry are recycled to the bismuth-antimony precipitation stage.

8. The process of claim 7 in which the third liquid fraction is passed to an arsenic-cadmium precipitation stage in which the third liquid fraction is admixed with a sulfidizing agent to form a slurry of a fourth liquid component and precipitated sulfides.

9. The process of claim 8 in which the sulfidizing agent is NaHS.

10. The process of claim 8 in which the slurry formed in the arsenic-cadmium precipitation stage is passed to a solid-liquid separation to form a fourth liquid fraction and a remaining slurry, and at least a part of the solids of the remaining slurry are recycled to the arsenic-cadmium precipitation stage.

11. The process of claim 10 in which the fourth liquid fraction is passed to a neutralization stage and is admixed with gaseous oxygen and a neutralizing agent to form a slurry of a fifth liquid component and precipitated sulfates.

12. The process of claim 11 in which the slurry of the fifth liquid component and precipitated sulfates is separated into a fifth liquid fraction and a remaining slurry of which at least a part of the solids are recycled to the neutralization stage.

13. The process of claim 12 in which the fifth liquid fraction is passed to a zinc precipitation stage, and is admixed with a base to form a slurry of a sixth liquid component and precipitated hydroxides.

14. The process of claim 13 in which the slurry formed of the sixth liquid component and the precipitated hydroxides is passed to a solid-liquid separation in which the slurry is separated into a sixth liquid fraction and a remaining slurry and at least a part of the solids of the remaining slurry is recycled to the neutralization stage.

15. The process of claim 14 in which the sixth liquid fraction is sent to a tailings dam.

16. The process of claim 15 in which the second liquid fraction is passed to a partial neutralization stage prior to transfer to the bismuth-antimony precipitation stage.

17. The process of claim 1 in which

A. The second liquid fraction is passed to a sulfidizing stage and is admixed with a hydrogen sulfide producing agent to form a slurry of a seventh liquid component and precipitated sulfides;

B. The slurry comprising the seventh liquid component is passed to a solid-liquid separation stage in which a seventh liquid fraction is separated from the slurry and at least a part of the solids of the remaining slurry are recycled to the sulfidizing stage;

C. The seventh liquid fraction is passed to a neutralization stage and is admixed with gaseous oxygen and a neutralizing agent to form a slurry of a eight liquid component and precipitated sulfates;

D. The slurry of the eight liquid component and precipitated sulfates is separated into a eight liquid fraction and a remaining slurry of which at least a part of the solids are recycled to the neutralization stage;

E. The eighth liquid fraction is passed to a zinc precipitation stage, and is admixed with a base to form a slurry of a ninth liquid component and precipitated hydroxides;

F. The slurry comprising the ninth liquid component and the precipitated hydroxides is passed to a solid-liquid separation in which the slurry is separated into a ninth liquid fraction and a remaining slurry and at least a part of the solids of the remaining slurry is recycled to the cadmium-zinc precipitation stage; and G. The ninth liquid fraction is sent to a tailings dam.

18. A hydrometallurgical process for the recovery of primary metal values and the capture and conversion of metal impurities to states that are acceptable for disposal to the environment from impurity streams generated during the pyrometallurgy of copper, the process comprising the steps of:

A. Acid leaching solids containing copper and at least one metal species selected from the group consisting of precious metals, bismuth, arsenic, iron and cadmium to produce an acid leach slurry of a first liquid component containing soluble metal species and a solid component depleted of the metal species;

B. Transferring the acid leach slurry from (A) to a copper precipitation stage, and admixing the acid leach slurry with a source of sulfur, a source of sulfur dioxide, steam, and recycled copper sulfide, to form a slurry of precipitated copper sulfide and a second liquid component depleted of copper;

C. Separating the slurry of (B) into a second liquid fraction comprising a portion of the second liquid component, and a residual fraction comprising the precipitated copper sulfide and the remaining second liquid component; and D. Recycling a portion of the precipitated copper sulfide to the copper precipitation stage.

19. The process of claim 18 in which the solids containing copper are pulped with water prior to admixture with the sources of sulfur and sulfur dioxide.

20. The process of claim 19 in which the slurry is additionally admixed with free sulfuric acid.

21. The process of claim 1 in which

A. The second liquid fraction is passed to a neutralization stage and is admixed with a neutralizing agent to form a slurry of tenth liquid component and precipitated sulfates;

B. The slurry comprising the tenth liquid component is passed to a solid-liquid separation in which an tenth liquid fraction is separated and at least a part of the solids of the remaining slurry are recycled to the neutralization stage;

C. The tenth liquid fraction is passed to a solvent extraction or ion exchange operation in which an eluent containing soluble bismuth and antimony values is separated from a raffinate containing soluble arsenic values;

D. The raffinate is passed to a sulfidizing stage and is admixed with a hydrogen sulfide producing agent to form a slurry of an eleventh liquid component and precipitated sulfides;

E. The slurry comprising the eleventh liquid component is passed to a solid-liquid separation stage in which an eleventh liquid fraction is separated from the slurry and at least a part of the solids of the remaining slurry are recycled to the sulfidizing stage;

F. The eleventh liquid fraction is passed to a neutralization stage and is admixed with gaseous oxygen and a neutralizing agent to form a slurry of a twelfth liquid component and precipitated sulfates;

G. The slurry of the twelfth liquid component and precipitated sulfates is separated into a twelfth liquid fraction and a remaining slurry of which at least a part of the solids are recycled to the neutralization stage;

H. The twelfth liquid fraction is passed to a zinc precipitation stage, and is admixed with a base to form a slurry of a thirteenth liquid component and precipitated hydroxides;

I. The slurry comprising the thirteenth liquid component and the precipitated hydroxides is passed to a solid-liquid separation in which the slurry is separated into a thirteenth liquid fraction and a remaining slurry and at least a part of the solids of the remaining slurry is recycled to the cadmium-zinc precipitation stage; and J. The thirteenth liquid fraction is sent to a tailings dam.

* * * * *